(No Model.)
J. F. FERGUSON.
COASTING APPARATUS.
No. 349,152. Patented Sept. 14, 1886.
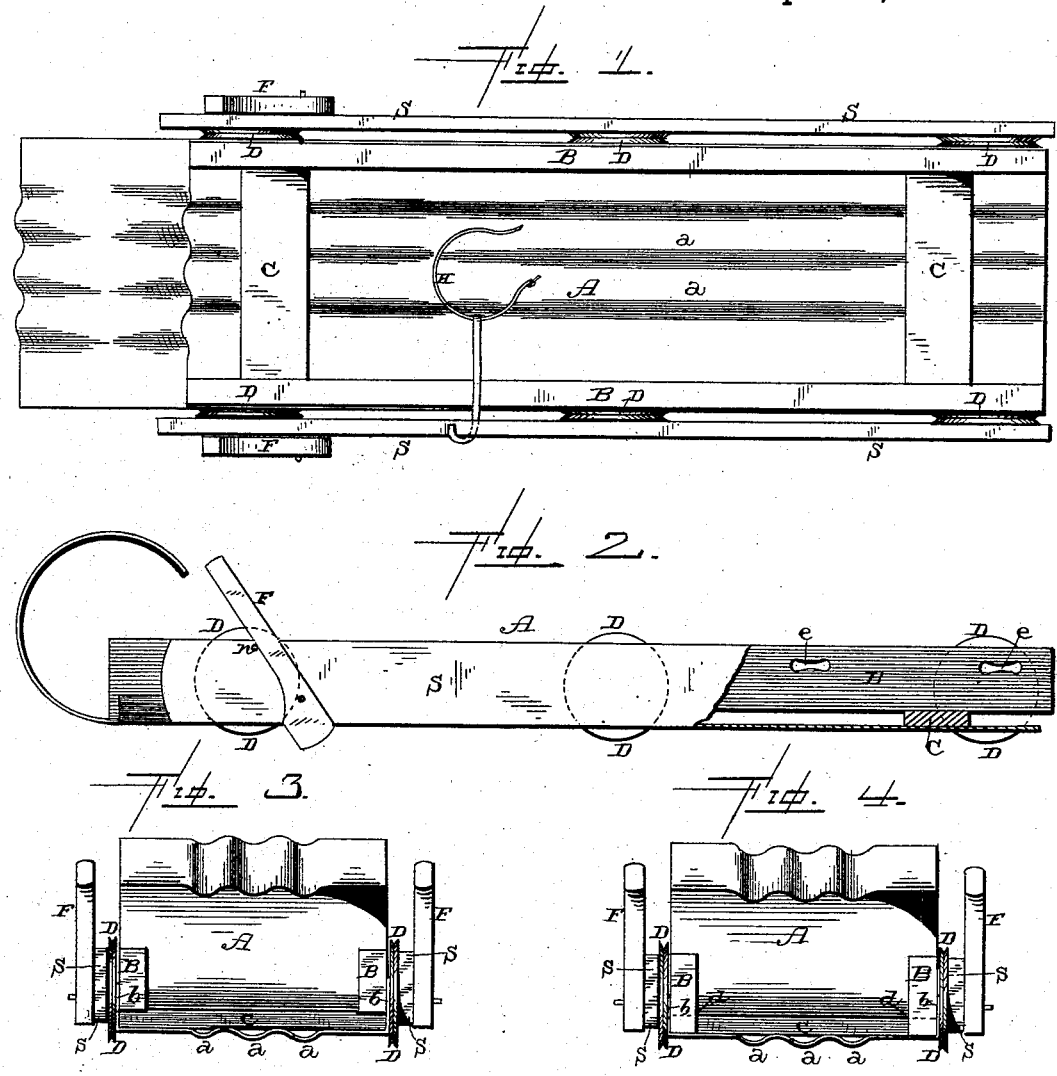
Witnesses.
L. F. Gardner
A. W. Brecht
Inventor.
Jas. F. Ferguson,
per
C. E. Allen,
Atty.

United States Patent Office.

JAMES F. FERGUSON, OF BURLINGTON, VERMONT.

COASTING APPARATUS.

SPECIFICATION forming part of Letters Patent No. 349,152, dated September 14, 1886.

Application filed February 16, 1886. Serial No. 192,127. (No model.)

*To all whom it may concern:*

Be it known that I, JAMES F. FERGUSON, a citizen of the United States, residing at Burlington, in the county of Chittenden and State of Vermont, have invented certain new and useful Improvements in Coasting Apparatus, of which the following is a specification, reference being had therein to the accompanying drawings.

My invention relates to improvements in coasting apparatus; and the objects of my invention are, first, to construct it of a material which shall be cheap and especially light and durable; second, to adapt it to summer as well as winter use; third, to provide a brake device by means of which its speed may be controlled at will; and, fourth, to arrange for its more convenient transportation, especially in the summer.

In the drawings, in which similar letters refer to similar parts, Figure 1 is a plan view of a coaster embodying my invention. Fig. 2 is a side elevation of the coaster, partly in section. Figs. 3 and 4 are end views.

A is my coasting apparatus, which is constructed of metal, having three or more corrugations, *a a*, formed longitudinally in its under surface by running it through a suitable beading-machine. Its side edges, *b b*, are turned upward for the purpose of being secured to the side bars, B B, which extend the length of the bottom and rest upon the flat space between the outside corrugations and the turned edges *b b*, suitable recesses, *d d*, being made in the lower side of the bars for the insertion of the ends of the cleats C C, which extend across the upper face of the coaster. The bars and cleats are rigidly secured to the sliding surface at the flat faces of the coaster, upon which they rest.

Through the sides of the bars B B, at convenient points, are suitable recesses, *e e*, to be grasped by the hands. If preferred, the side bars may rest only on the ends of the cleats C C, as shown in Fig. 3, to which they will be secured. In which event the hands can be passed around the bars B B through the open space thus left between the cleats, care being taken to cut away the edges *b b* sufficient for the hand to pass through. The end of the curved front is rolled and held by fastenings in the ordinary way. Thus constructed the coaster possesses all the stiffness, elasticity and strength desired, while the under surface is smooth, hard, and durable and especially adapted for speed.

D D are removable wheels, two or more of which are designed to be journaled between the bars B B and strips S S, which are removably secured to the outside of the bars B B; or, if preferred, they may be attached on either side of the bottom of the coaster by suitable screws or bolts which enter the ends of the cleats C C, or the side bars, B B. Upon these wheels the entire coasting apparatus firmly rests, for the purpose of enabling it to roll rapidly down an inclined plane which is not coated with snow or ice. By this arrangement great speed is obtained, and, in order that the coaster may be kept in its track, the rim or face of the wheels may be either grooved to run in corresponding tracks or the sides of the inclined plane may be provided with suitable guide-strips to prevent the coaster from running off. In order that its speed may be readily controlled, I provide suitable levers, F F, which are pivoted to the outside of the strips S S, or, if these are not used, to the bars B B. The lower extremities of these levers are of a segmental form, so that by operating their handles these segmental ends may be forced down tightly against the surface of the inclined plane and there held by stops *n n*, and thereby greatly retard if they do not entirely stop the movement of the coaster. By operating either one of these levers the direction of the coaster can be changed at will. The under faces of the segmental ends of the levers may be shod with rubber or other suitable material to prevent wear and increase the force of their frictional contact with the surface of the inclined plane.

Should it be desired to use the coaster in winter upon a snow or ice surface the wheels D D, with their attachments, may be readily removed, thereby changing the coaster into an ordinary toboggan. In such event the shoes on the levers F F may be roughened or metal pointed, if so desired.

To more conveniently transport the coaster back to the starting-point, especially when wheels are used, I provide a strap or rope, H, designed to be worn around the person, having suitable wire hooks to catch into the central handle on one side, by means of which the coaster can be easily raised from the ground, as its weight is light, and then be secured to the side of the person, and thus be carried with great ease.

What I claim as my invention, and desire to secure by Letters Patent, is—

1. A coasting apparatus having its bottom portion made of thin metal and provided with the corrugations $a$, substantially as shown.

2. A coasting apparatus having its bottom made of light corrugated metal, in combination with cross-pieces C and the side bars, B, substantially as described.

3. In a coasting apparatus, the combination of the side bars, B, the removable strips S, placed outside of the side bars, and the wheels D, the strips S and the wheels D being made detachable at will, substantially as set forth.

4. The combination, with a coasting apparatus provided with the removable side strips, S, of the levers F, which are pivoted to the strips, and the stops $n$, substantially as specified.

5. The combination, with a coasting apparatus provided with handles $e$, of a strap and a hook, substantially as shown.

In testimony whereof I do affix my signature in presence of two witnesses.

JAMES F. FERGUSON.

Witnesses:
R. M. CLAPP,
CHARLES E. ALLEN.